US006541099B1

(12) United States Patent

Merker et al.

(10) Patent No.: US 6,541,099 B1

(45) Date of Patent: Apr. 1, 2003

(54) CREPING ADHESIVE AND PRODUCTS AND PROCESS INCORPORATING SAME

(75) Inventors: Joseph F. Merker, Alpharetta, GA (US); Ralph L. Anderson, Marietta, GA (US); Thomas C. Saffel, Alpharetta, GA (US); James W. Clark, Roswell, GA (US); Reginald Smith, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/544,425

(22) Filed: Apr. 6, 2000

Related U.S. Application Data

(60) Provisional application No. 60/130,410, filed on Apr. 7, 1999.

(51) Int. Cl.[7] .......... B32B 23/02

(52) U.S. Cl. .......... 428/194; 428/292.1; 428/220; 428/195; 428/194; 428/401; 428/511; 428/530

(58) Field of Search .......... 428/211, 530, 428/511, 288, 101, 103, 401, 193, 194, 195, 212, 220, 292.1

(56) References Cited

U.S. PATENT DOCUMENTS

| | | | | | |
|---|---|---|---|---|---|
| 2,960,089 | A | * | 11/1960 | Harwood et al. | |
| 3,059,313 | A | * | 10/1962 | Harmon | |
| 3,879,257 | A | | 4/1975 | Gentile et al. | |
| 4,277,529 | A | * | 7/1981 | Friedman | 428/211 |
| 4,440,898 | A | | 4/1984 | Pomplun et al. | |
| 5,529,665 | A | | 6/1996 | Kaun | |

* cited by examiner

*Primary Examiner*—Merrick Dixon
(74) *Attorney, Agent, or Firm*—Dority & Manning, P.A.

(57) ABSTRACT

The present invention is generally directed to base webs that are creped after a bonding material has been applied to at least one side of the web according to a predetermined pattern. According to the present invention, the bonding material contains a creping adhesive mixed with composite particles. The composite particles generally have a median particle size of less than about 5 microns and a particle size distribution of less than about 10 microns.

27 Claims, 2 Drawing Sheets

CREPING ADHESIVE AND PRODUCTS AND PROCESS INCORPORATING SAME

RELATED APPLICATIONS

The present application is based upon a provisional application filed on Apr. 7, 1999 and having Ser. No. 60/130,410.

FIELD OF THE INVENTION

The present invention is generally directed to an improved creping adhesive. More particularly, the present invention is directed to a creping adhesive used in print and crepe operations for producing wipers and other liquid absorbent products.

BACKGROUND OF THE INVENTION

Liquid absorbent products such as paper towels, tissue paper, feminine hygiene products, industrial wipers, food service wipers, napkins, medical pads, and other similar products are designed to include several important properties. For example, the products should generally have good bulk, a soft feel and should be highly absorbent. Depending on the application, the products should also have good strength even when wet and should resist tearing. Further, many products should also have good stretch characteristics, should be abrasion resistant, and should not deteriorate in the environment in which they are used.

One particular process that has proven to be very successful in producing paper towels and other wiping products is disclosed in U.S. Pat. No. 3,879,257 to Gentile, et al., which is incorporated herein by reference in its entirety. In Gentile. et al., a process is disclosed for producing soft, absorbent, single ply fibrous webs having a laminate-like structure that are particularly well suited for use as wiping products.

The fibrous webs disclosed in Gentile, et al. are formed from an aqueous slurry of principally lignocellulosic fibers under conditions which reduce inner fiber bonding. A bonding material, such as a latex elastomeric composition, is applied to a first surface of the web in a spaced-apart pattern. In particular, the bonding material is applied so that it covers from about 50% to about 60% of the surface area of the web. The bonding material provides strength to the web and abrasion resistance to the surface. Once applied, the bonding material can penetrate the web preferably from about 10% to about 40% of the thickness of the web.

The bonding material can then be similarly applied to the opposite side of the web for further providing additional strength and abrasion resistance. Once the bonding material is applied to the second side of the web, the web can be brought into contact with a creping surface. Specifically, the web will adhere to the creping surface according to the pattern to which the bonding material was applied. The web is then creped from the creping surface with a doctor blade. Creping the web greatly disrupts the fibers within the web, thereby increasing the softness, absorbency, and bulk of the web.

In one of the preferred embodiments disclosed in Gentile, et al., both sides of the paper web are creped after the bonding material has been applied. Gentile, et al. also discusses the use of chemical debonders to treat the fibers prior to forming the web in order to further reduce innerfiber bonding and to increase softness and bulk.

Although the processes disclosed in Gentile, et al. have provided great advancements in the art of making disposable wiping products, the present invention is directed to further improvements in nonwoven fibrous base webs. In particular, the present invention is directed to a fibrous base web incorporating an improved bonding material or creping adhesive that is used during creping the base web. The creping adhesive of the present invention is not only economical to produce in comparison to conventional materials, but also has improved adhesive strength, has improved solvent resistance, and improves latex efficiency.

SUMMARY OF THE INVENTION

As stated above, the present invention is directed to further improvements in prior art constructions and methods, which are achieved by providing a nonwoven base web made from pulp fibers, synthetic fibers, and/or other various fibers. A bonding material is applied to at least one side of the base web. In particular, the bonding material may be applied to the web according to a predetermined pattern, such as a geometric pattern. In accordance with the present invention, the bonding material applied to the web contains a mixture of an adhesive and composite particles. In general, the adhesive can be any conventionally used print creping adhesive such as an acrylate, a vinyl acetate, a vinyl chloride, or a methacrylate. In one embodiment, the adhesive can be cross-linkable in order to make the resulting product water resistant. Cross-linkable adhesives include styrene butadiene such as carboxylated styrene butadiene or an ethylene vinyl acetate copolymer. For example, the ethylene vinyl acetate copolymer can be cross-linked with N-methyl acrylamide groups.

The composite particles combined with the adhesive, on the other hand, comprises ultrafine particles. The composite particles can be present in the bonding material generally in an amount up to about 30% by weight and particularly from about 10% to about 30% by weight. According to the present invention, the composite particles can have a median particle size of less than about 5 microns, particularly less than about 1 micron, and more particularly less than about 0.5 microns. The composite particles can have a particle size distribution of less than about 10 microns, particularly less than about 5 microns, and more particularly less than about 1 micron.

The composite particles used in the present invention can generally be made from any material that does not completely dissolve in the adhesive, does not damage the base web, or does not have an adverse impact on the adhesive. For example, the composite particles can be made from clays, titanium dioxide, talc, zeolite, silica, calcium carbonate, or mixtures thereof. In one embodiment, the composite particles are obtained from kaolin clay.

When present in the bonding material, it has been discovered that the composite particles increase the adhesive strength of the adhesive without adversely interfering with the other properties of the adhesive. In fact, the composite particles improve the efficiency of the adhesive, meaning that less adhesive can be used in forming products in accordance with the present invention.

The bonding material applied to the base web can be applied in a pattern that covers from about 10% to about 60%, and more particularly from about 20% to about 50% of the surface area of each side of the web. The bonding material can be applied to each side of the web in an amount up to about 10% by weight, and particularly from about 2% to about 8% by weight. Once applied, the bonding material can penetrate the web in an amount from about 10% to about 60% of the total thickness of the web, and particularly from about 15% to about 40% of the thickness.

The preselected pattern used to apply the bonding material can be, in one embodiment, a reticular interconnected design. Alternatively, the preselected pattern can comprise a succession of discrete shapes, such as dots. In a further alternative embodiment of the present invention, the preselected pattern can be a combination of a reticular interconnected design and a succession of discrete shapes.

Once formed, the base web of the present invention can have any suitable basis weight such as from about 20 pounds per ream to about 80 pounds per ream, depending upon the particular application. The base web can be used in numerous products. For instance, the base web can be used as a wiping product, as a napkin, as a tissue paper, as a feminine hygiene product, as a medical pad, as a placemat, as a cover material such as a car cover, as a paint drop cloth, as one layer in a laminate product or as any other similar liquid absorbent product or filter product.

Alternatively, the present invention is directed to a creping adhesive composition for adhering a base web to a creping surface. The creping adhesive composition contains an adhesive, such as an acrylate, a vinyl acetate, a vinyl chloride, a methacrylate or a styrene butadiene. In one embodiment, for instance, the adhesive can be a cross-linked latex, such as a cross-linked ethylene vinyl acetate copolymer.

In accordance with the present invention, the creping adhesive composition further contains composite particles as described above. For instance, the composite particles can have a median particle size of less than about 1 micron and a particle size distribution wherein 90% of the composite particles have a size less than about 5 microns. The composite particles can be present in the composition in an amount up to about 30% by weight.

Once applied to a base web, it has been discovered that the creping adhesive composition of the present invention has an adhesive strength equivalent to or better than a creping adhesive composition applied to a base web in the same amount that contains the adhesive but not the composite particles.

The composite particles can be, for instance, clay, titanium dioxide, talc, zeolite, silica, and mixtures thereof. In one embodiment, kaolin clay is used. The kaolin clay can have a median particle size of less than about 0.5 microns and can have a particle size distribution wherein 90% of the particles have a particle size less than about 1 micron.

Other features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

Figure 1:
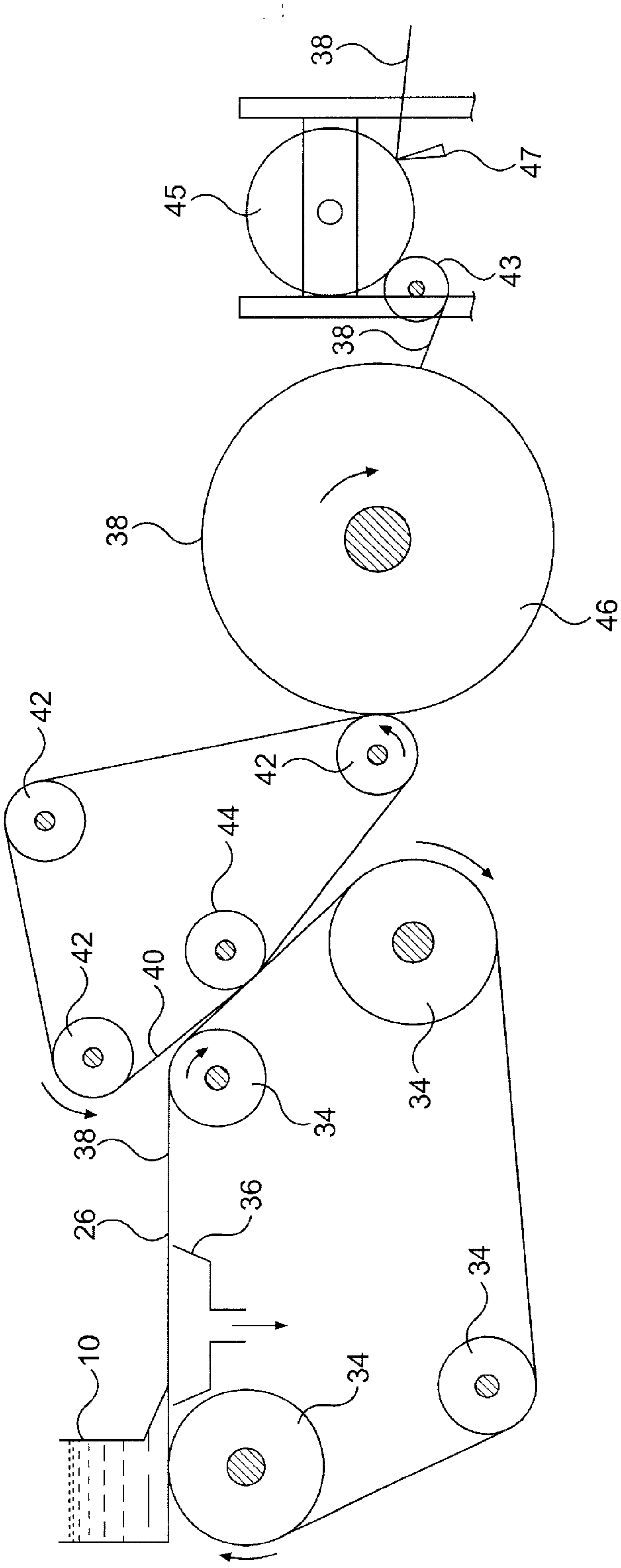
FIG. 1 is a schematic diagram of a fibrous web forming machine that crepes one side of the web.

Repeat use of reference characters in the present specification and drawings is intended to represent same or analogous features or elements of the present invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a printing and creping process for paper and nonwoven substrates incorporating an improved bonding material. Specifically, the bonding material is applied to at least one side of the substrate in a preselected pattern. Once the bonding material is applied to the substrate, the substrate can then be creped. For instance, the base web can be adhered to a creping surface and then creped from the surface using, for instance, a creping blade. In general, the bonding material of the present invention comprises a mixture of an adhesive combined with composite particles. The adhesive can be, for instance, any conventionally used creping adhesive. The composite particles, on the other hand, comprise ultrafine particles made from various materials, such as clay.

According to the present invention, it has been discovered that by incorporating selected amounts of composite particles into the bonding material, various benefits and advantages are obtained. For example, one of the more expensive components of a print/crepe product is the creping adhesive. By incorporating composite particles into the bonding material, less adhesive is needed in constructing the products of the present invention. Specifically, the composite particles are much less expensive than the adhesive, thus significantly reducing costs.

Besides reducing costs, it has been unexpectedly discovered that the composite particles actually improve the adhesive strength of the bonding material. Specifically, it has been discovered that the bonding efficiency of the adhesive is improved in that the same creping adhesive strength is observed when applying the adhesive alone to a substrate in comparison to replacing a portion of the adhesive with the composite particles of the present invention. In particular, it has been discovered that the bonding material of the present invention adheres just as well if not better to a creping surface as opposed to a bonding material that does not contain the composite particles.

Another benefit of the present invention is that creped products incorporating the bonding material are believed to have improved solvent resistance due to the presence of the composite particles. Also, since the composite particles are used to dilute the adhesive, odors caused by the adhesive are reduced in the final product. Further, the presence of the composite particles makes the bonding material less tacky. Consequently, the bonding material of the present invention has a lesser tendency to foul up equipment used to form the products of the present invention and the products themselves have decreased surface friction resulting in an improved handfeel.

All of the above advantages and benefits of the present invention are also achieved without substantially degrading the strength or absorbency of the print/creped products. Further, it has been discovered that the stiffness of the products is not substantially increased. In fact, the composite particles actually increase the efficiency of the adhesive that is used since less adhesive is incorporated into the final product.

In general, the bonding material of the present invention can be used with any suitable nonwoven or paper-based web. For instance, the web can be made from pulp fibers, such as softwood fibers, hardwood fibers or mixtures thereof. Instead of or in addition to pulp fibers, the web can also contain synthetic fibers, such as fibers made from various polymeric materials. The synthetic fibers can be staple fibers or can be other various types of fibers or filaments. Further, the base web can be made from a homogeneous mixture of fibers or can be made from a stratified fiber furnish having a plurality of layers that contain different types of fibers.

The base web made according to the process of the present invention, for most applications, should be formed without a substantial amount of inner fiber-to-fiber bond strength. In this regard, the fiber furnish used to form the base web can be treated with a chemical debonding agent. Suitable debonding agents that may be used in the present invention when the base web contains pulp fibers include cationic debonding agents such as fatty dialkyl quaternary amine salts, mono fatty alkyl tertiary amine salts, primary amine salts, imidazoline quaternary salts, and unsaturated fatty alkyl amine salts. Other suitable debonding agents are disclosed in U.S. Pat. No. 5,529,665 to Kaun which is incorporated herein by reference.

In one preferred embodiment, the debonding agent used in the process of the present invention can be an organic quaternary ammonium chloride. In this embodiment, the debonding agent can be added to the fiber slurry in an amount from about 0.1% to about 1% by weight, based on the total weight of fibers present within the slurry.

The manner in which the base web of the present invention is formed may vary depending upon the particular application. For instance, in one embodiment, the web can be formed in a wet lay process according to conventional paper making techniques. In a wet lay process, the fiber furnish is combined with water to form an aqueous suspension. The aqueous suspension is spread onto a wire or felt and dried to form the web.

Alternatively, the base web of the present invention can be air formed. In this embodiment, air is used to transport the fibers and form a web. Air forming processes are typically capable of processing longer fibers than most wet lay processes, which may provide an advantage in some applications.

As described above, the present invention is particularly directed to the use of an improved bonding material that is applied to a base web for creping the web. The bonding material contains a mixture of an adhesive and composite particles. The adhesive can be any conventionally used creping adhesive or other suitable adhesive, such as a latex adhesive. Examples of adhesives that may be used in the bonding material of the present invention are acrylates, vinyl acetates, vinyl chlorides, and methacrylates.

In one embodiment of the present invention, preferably the adhesive is a cross-linkable adhesive for increasing the wet strength of the base web. For example, the adhesive can be styrene butadiene. In an alternative embodiment, the adhesive can comprise an ethylene vinyl acetate copolymer. In particular, the ethylene vinyl acetate copolymer can be cross-linked with N-methyl acrylamide groups using an acid catalyst. Suitable acid catalysts include ammonium chloride, citric acid, and maleic acid.

In accordance with the present invention, the bonding material also contains composite particles combined with the adhesive. The composite particles can be added to the bonding material in an amount up to about 40% by weight, particularly from about 10% to about 30% by weight, and in one embodiment, in an amount of about 20% by weight. The composite particles comprise ultrafine particles.

For instance, the composite particles should have a median particle size of less than about 5 microns, particularly less than about 1 micron, and more particularly less than about 0.5 microns. As used herein, median particle size refers to the fact that 50% of the particles in a distribution are larger than the median particle size, while 50% of the particles are also smaller in size than the median particle size.

Besides having a small median particle size, the composite particles preferably also have a limited particle size distribution. As used herein, a particle size distribution refers to the fact that all or substantially all of the composite particles present in the bonding material have a particle size less than a predetermined value. For example, in one embodiment, the composite particles can have a particle size distribution of less than about 10 microns, meaning that substantially all of the composite particles present within the bonding material have a particle size of less than 10 microns. In other embodiments, the composite particles can have a particle size distribution of less than about 5 microns, and more particularly can have a particle size distribution of less than about 1 micron.

It should be understood, however, that although it is important that most of the composite particles used in the bonding material according to the present invention be of a small size, it is believed that it is generally not critical that all of the particles have an ultrafine size. It is believed that larger composite particles may be mixed with the smaller composite particles. For example, in one embodiment, 90% of the particles can have a size of less than about 10 microns, particularly less than about 5 microns, and more particularly less than about 1 micron, which allows for up to 10% of the particles to have a larger size.

In a further example, 98% of the particles can have a size of less than about 10 microns, particularly less than about 5 microns, and more particularly can have a particle size of less than about 1 micron.

Median particle sizes and particle size distributions as described above can be determined in various manners. In one embodiment a sedigraph can be used in order to measure the particles. One example of a commercially available sedigraph is the SediGraph 5100 Particle Size Analysis System that is marketed by Micromeritics Corporation of Norcross, Ga.

It should be understood, however, that the composite particles of the present invention can be measured in various manners and that the above description is for exemplary purposes only. It should also be understood that the basic principles of the present invention are independent from the manner in which the particle sizes are measured and reported. Further, variations can occur in reported particle sizes based on the technique used to measure the particles. One skilled in the art, however, should be capable of discerning and differentiating between the various techniques in practicing the objectives and teachings of the present invention.

The composite particles can be obtained from various different materials. For instance, generally any material can be used as long as the material does not adversely interfere with the adhesive and as long as the material is relatively stable in the adhesive. Examples of materials that may be used in the present invention include various types of clay, titanium dioxide, talc, zeolite, silica, or mixtures thereof.

In one exemplary embodiment, the composite particles comprise HYDROGLOSS clay obtained from J. M. Huber Corporation of Macon, Ga. HYDROGLOSS clay comprises kaolin clay wherein 50% of the particles are less than 0.2 microns (median particle size of about 0.18 microns), 90% of the particles are less than 0.5 microns, and 98% of the particles are less than 5 microns.

Besides an adhesive and the composite particles, the bonding material of the present invention can also contain other various ingredients. For instance, the bonding material can contain one or more stabilizers to prevent agglomeration and to increase the stability of the suspension. Stabilizers that may be added to the bonding material include cellulose derivatives, such as hydroxy ethyl cellulose or methyl hydroxy cellulose. Other stabilizers that may be used include water soluble gums, acetates, such as polyvinyl acetate, and acrylics.

Besides stabilizers, although not necessary, the bonding material can contain one or more surfactants. For most applications, nonionic surfactants should be used.

The bonding material generally has a pH of greater than 7, particularly from about 7 to about 9, and more particularly from about 7 to about 8. At pH's less than about 7, the composite particles may have a tendency to agglomerate, depending upon the material chosen. The bonding material generally can have a solids content of less than about 50%, and particularly less than about 40%. For most applications, the solids content should be from about 30% to about 40%, although lower ranges can be used. The viscosity of the bonding material generally should be at least 20 centipoise, and particularly from about 50 centipoise to about 120 centipoise.

In one preferred embodiment of the present invention, the bonding material includes a cross-linked ethylene vinyl acetate copolymer adhesive combined with HYDROGLOSS clay in a 4 to 1 weight ratio. The bonding material includes a hydroxy ethyl cellulose stabilizer and an acrylic stabilizer that is included in the HYDROGLOSS clay. The bonding material can have a solids content of from about 30% to about 40% and a viscosity of from about 20 centipoise to about 120 centipoise.

Figure 2:
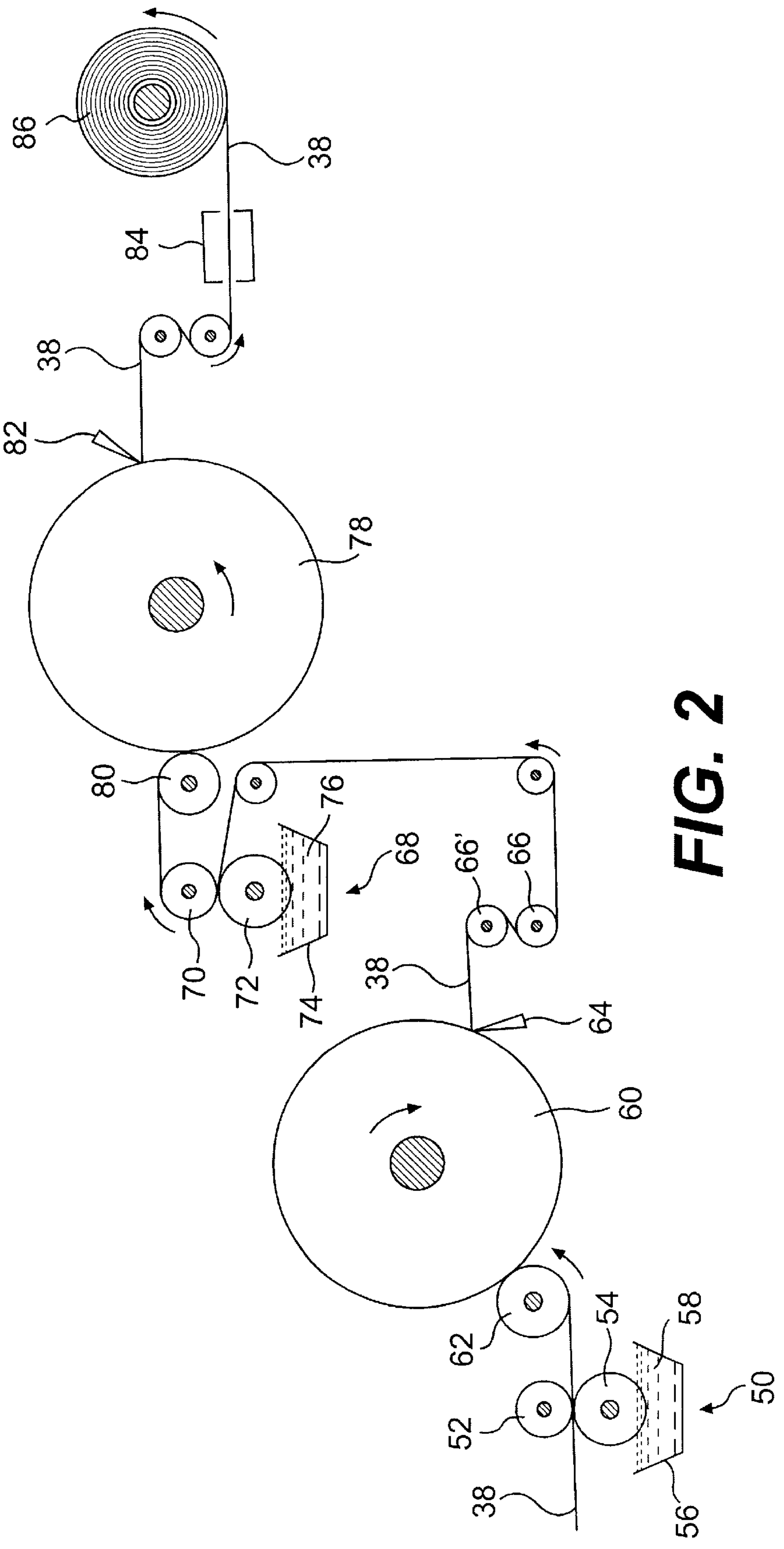
FIG. 2 is a schematic diagram of one embodiment of a system for double creping a base web in accordance with the present invention.

Referring to FIGS. 1 and 2, one embodiment of a process for producing a base web in accordance with the present invention is illustrated. The process illustrated in the figures depicts a wet lay process, although, as described above, other techniques for forming the base web of the present invention may be used.

Referring to FIG. 1, one embodiment of a base web forming machine is illustrated capable of receiving a fiber suspension from a head box 10 and forming a Web. As shown, in this embodiment, a forming fabric 26 is supported and driven by a plurality of guide rolls 34. A vacuum box 36 is disposed beneath forming fabric 26 and is adapted to remove water from the fiber furnish to assist in forming a web.

From forming fabric 26, a formed web 38 is transferred to a second fabric 40, which may be either a wire or a felt. Fabric 40 is supported for movement around a continuous path by a plurality of guide rolls 42. Also included is a pick up roll 44 designed to facilitate transfer of web 38 from fabric 26 to fabric 40. Preferably, the speed at which fabric 40 is driven is approximately the same speed at which fabric 26 is driven so that movement of web 38 through the system is consistent.

From fabric 40, web 38, in this embodiment, is transferred to the surface of a rotatable heated dryer drum 46, such as a Yankee dryer. Web 38 is lightly pressed into engagement with the surface of dryer drum 46 to which it adheres, due to its moisture content and its preference for the smoother of the two surfaces. As web 38 is carried through a portion of the rotational path of the dryer surface, heat is imparted to the web causing most of the moisture contained within the web to be evaporated.

In an alternative embodiment, web 38 can be through dried instead of being placed on a dryer drum. A through dryer accomplishes the removal of moisture from the web by passing air through the web without applying any mechanical pressure. Through drying can increase the bulk and softness of the web.

From drier drum 46, as shown in FIG. 2, web 38 is pressed into engagement with a creping drier 45 by a press roll 43. Press roll 43 in combination with creping drier 45 apply a sufficient amount of heat and pressure to web 38 for causing the web to adhere to the creping drier surface without the use of an adhesive. An adhesive, however, if desired may be applied over the surface of the web or drum for facilitating attachment of the web to the drum.

Web 38 is then removed from drier drum 45 by a creping blade 47. Creping web 38 as it is formed reduces internal bonding within the web and increases softness.

Once paper web 38 is formed, the bonding material of the present invention may be applied to at least one side of the web and at least one side of the web may then be creped. For most applications, desirably the bonding material is applied to both sides of the web and both sides of the web are creped. When the base web of the present invention is used in a multi-ply laminate, however, it may be desired to only apply the bonding material to one side of the web. For instance, when making a two-ply product, two base webs made according to the present invention may be brought together and joined along adjacent surfaces where the bonding material has not been applied.

Referring to FIG. 2, a process for applying the bonding material to both sides of the web and to creping both sides of the web in accordance with the present invention is illustrated. As shown, desirably, base web 38 made according to the process illustrated in FIG. 2 or according to a similar process, is passed through a first bonding material application station generally 50. Station 50 may include a nip formed by a smooth rubber press roll 52 and a patterned rotogravure roll 54. Rotogravure roll 54 may be in communication with a reservoir 56 containing a bonding material 58 made in accordance with the present invention. Rotogravure roll 54 applies bonding material 58 to one side of web 38 in a preselected pattern.

Web 38 is then pressed into contact with a first creping drum 60 by a press roll 62. The bonding material causes only those portions of the web where it has been disposed to adhere to the creping surface. If desired, creping drum 60 can be heated for promoting attachment between the web and the surface of the drum and for partially drying the web.

Once adhered to creping drum 60, web 38 may be brought into contact with a creping blade 64. Specifically, web 38 may be removed from creping roll 60 by the action of creping blade 64, performing a first controlled pattern crepe on the web.

Once creped, web 38 can be advanced by pull rolls 66 to a second bonding material application station generally 68. Station 68 may include a transfer roll 70 in contact with a rotogravure roll 72, which may be in communication with a reservoir 74 also containing a bonding material 76 made in accordance with the present invention. Similar to station 50, bonding material 76 may be applied to the opposite side of web 38 in a preselected pattern. Once the bonding material is applied, web 38 may be adhered to a second creping roll 78 by a press roll 80. Desirably, web 38 is carried on the surface of creping drum 78 for a distance and then removed therefrom by the action of a second creping blade 82. Second creping blade 82 performs a second controlled pattern creping operation on the second side of the base web.

Once creped for a second time, base web 38, in this embodiment, is pulled through a curing or drying station 84. Drying station 84 can include any form of a heating unit, such as an oven energized by infrared heat, microwave energy, hot air or the like. Drying station 84 may be necessary in some applications to dry the web and/or cure the bonding material. Depending upon the adhesive selected in the bonding material, however, in other applications drying station 84 may not be needed.

Once drawn through drying station 84, web 38 can be wound into a roll of material 86 for immediate use of for further processing according to the present invention.

The bonding material applied to each side of base web 38 not only assists in creping the web but also adds dry strength, wet strength, stretchability, and tear resistance to the web. The bonding material also prevents lint from escaping from the web during use.

The bonding material may be applied to the base web as described above in a preselected pattern. In one embodiment, for instance, the bonding agent can be applied to the web in a reticular pattern, such that the pattern is interconnected forming a net-like design on the surface.

In an alternative embodiment, the bonding material can be applied to the web in a pattern that represents a succession of dots or other geometric shapes. Applying the bonding material in discrete shapes, such as dots, provides strength to the web without covering a substantial portion of the surface area of the web.

In general, according to the present invention, the bonding material may be applied to each side of the base web so as to cover from about 10% to about 60% of the surface area of the web. More particularly, in most applications, the bonding material will cover from about 20% to about 50% of the surface area of each side of the web. The amount of bonding material applied to each side of the web will desirably be in the range of from about 2% to about 10% by weight and particularly from about 2% to 8% by weight, based upon the total weight of the web. For instance, in one embodiment, the bonding material can be applied to each side of the web in an amount of about 7% by weight.

At the above amounts, the bonding material can penetrate the base web from about 10% to about 60% of the total thickness of the web. In most applications, the bonding material should at least penetrate about 15% of the thickness of the web.

The basis weight of base webs made according to the present invention can vary depending upon the particular application. In general, for most applications, the basis weight can be from about 20 pounds per 2,880 square feet (ream) to about 80 pounds per ream. Some of the uses of the base webs include use as a wiping product, as a napkin, as a medical pad, as a tissue, as a feminine hygiene product, as an absorbent layer in a laminate product, as a placemat, as a drop cloth, as a cover material, or for any product that requires liquid absorbency or filter properties.

The present invention may be better understood with reference to the following example.

EXAMPLE

The following example was performed in order to compare base webs made according to the present invention with base webs that have been used in the past as a wiping product. In particular, base webs treated with a bonding material in accordance with the present invention were compared with base webs treated and creped with conventional bonding materials.

Specifically, in this sample, a fibrous web was formed according to a process similar to the one illustrated in FIG. 1. The fibrous web was made from pulp fibers, namely softwood fibers and had a basis weight of from about 39 pounds per ream to about 48 pounds per ream.

After the web was formed, a bonding material was printed on each side of the web and each side was creped similar to the process illustrated in FIG. 2. In one embodiment, representing the control, the bonding material used was a conventional creping adhesive containing a cross-linked ethylene vinyl acetate copolymer. In another embodiment, composite particles in accordance with the present invention were added to the above creping adhesive. The composite particles comprised HYDROGLOSS clay as previously described above. The HYDROGLOSS clay was added to the bonding material so as to replace 20% by weight of the ethylene vinyl acetate copolymer.

In both embodiments, the bonding materials were applied to each side of the web according to a diamond-shaped pattern (90×60 mesh).

In general and unless otherwise specified below, the bonding materials were applied to the web in an amount of about 12% by weight. In some examples, however, the printing pressure that applied the bonding material was varied which caused more or less bonding material to be applied to the web.

Once the base webs were creped, the webs were tested for various properties in order to compare the bonding material of the present invention with conventional bonding materials.

For example, referring to Table 1 below, a conventionally made base web was compared with a base web containing the bonding material of the present invention with respect to the adhesive strength of the bonding material and the wet tensile strength of the resulting product. In order to measure creping tension, each base web was pressed into contact with a creping drum and creped from the drum. A pull roll was used to pull each base web from the drum as the web was being creped. A floating roll held in place by tension springs was positioned in between the pull roll and the creping drum. Specifically, the floating roll was positioned such that the floating roll was pushed down and deflected as more tension was placed on the web in order to pull the web from the creping drum. The amount of deflection of the floating roll was measured. A greater amount of deflection indicated a greater adhesive force formed between the web and the creping drum.

Wet tensile strength, on the other hand, was tested after the base webs had been contacted with water. Specifically, wet test specimens were clamped at opposing sides and pulled until failure occurred.

The following results were obtained:

TABLE 1

| | | Adhesive Strength | | |
|---|---|---|---|---|
| Sample | % Clay (wt) | Creping Tension (mils deflection) | Cured Cross Direction Wet Tensile (oz/in) | Basis Weight (lbs/ream) |
| Ex 1 (control) | — | 65 | 13.8 | 39.1 |
| Ex 2 | 20 | 85 | 14.8 | 40.0 |

TABLE 1-continued

| Bulk (summation of mils of thickness of 8 plys at 3 locations) | Solids (%) | Viscosity (cps) | Print Pressure (Psig) |
|---|---|---|---|
| 404 | 40% | 110 | 30 |
| 447 | 40% | 110 | 30 |

As shown above, the base web treated with the bonding material of the present invention had improved creping tension, higher bulk, and more wet tensile strength in the cross-direction.

As shown in Table 2 below, further wet tensile strength tests were also conducted. In these set of tests, however, the samples were contacted with various different solvents and the strength was determined in the machines direction.

TABLE 2

Solvent Tensile Strength

| Solvent | Wet Tensile Strength in Machine Direction (oz/in) | |
|---|---|---|
| | Ex 3 (control) | Ex 4 (20% clay) |
| Water | 27.4 | 26.9 |
| Methylethyl ketone | 18.7 | 17 |
| Toluene | 18.4 | 18.3 |
| Trichloroethane | 20.1 | 18.4 |
| Mineral Spirits | 40.3 | 39 |
| Isopropyl Alcohol | 14.6 | 12.8 |

As shown above, the wet strength of both base webs were comparable.

Table 3 below provides absorbency properties of base webs made according to the present invention in comparison to conventionally made base webs. In particular, wicking tests were conducted in the Z direction and in the X-Y direction. During a wicking test, a sample strip of the material is positioned above a liquid reservoir containing a known weight and volume of a liquid saline solution. A stop watch is started as soon as the strip is contacted with the liquid. The vertical distance of the liquid front traveling up the sample strip and the liquid weight absorbed by the sample strip at various times was recorded. The following results were obtained:

TABLE 3

Absorbency Properties

| Sample | Print Pressure (Psi) | % Clay (wt) | Z Direction Wicking (gr/gr/sec) | X Y Direction Wicking (gr/gr/sec) |
|---|---|---|---|---|
| Ex 5 (control) | 20 | — | 1.57 | 0.76 |
| Ex 6 (control | 30 | — | 1.16 | 0.66 |
| Ex 7 | 20 | 20 | 1.56 | 0.75 |
| Ex 8 | 30 | 20 | 1.56 | 0.77 |

As shown above, base webs made according to the present invention have comparable if not better wicking properties than conventionally made base webs.

Table 4 below lists the bending stiffness of the samples.

TABLE 4

Bending Stiffness

| Sample | % Clay (wt) | (a) Machine Direction (in) | (b) Cross Direction (in) | (a + b) (in) |
|---|---|---|---|---|
| Ex 9 (control) | — | 4.4 | 7.1 | 11.5 |
| Ex 10 | 20 | 4.9 | 6.6 | 11.5 |

The above stiffness test determines the bending length of a fabric using the principle of cantilever bending of the fabric under its own weight. The bending length is a measure of the interaction between fabric weight and fabric stiffness. In this test, a fabric strip is slid at a constant rate in a direction parallel to its long dimension so that its leading edge projects from the edge of a horizontal surface. The length of the overhang is measured when the tip of the specimen is depressed under its own weight to the point where the line joining the tip of the fabric to the edge of the platform makes a 41.5° angle with the horizontal. The longer the overhang, the slower the specimen was to bend, indicating a stiffer fabric.

As shown above, both base webs tested had substantially the same stiffness characteristics.

An abrasion resistance test was also performed on the samples.

The results are indicated in Table 5 below.

TABLE 5

Abrasion Resistance

| Sample | % Clay (wt) | Abrasion Resistance (cycles) | |
|---|---|---|---|
| | | Water | Mineral Spirits |
| Ex 11 (control) | — | 19 | 71 |
| Ex 12 | 20 | 15 | 65 |

Abrasion resistance was measured using the taber abrasion test. This test measures the number of cycles required for an abrasion wheel to wear completely through the fabric. As shown above, a base web made according to the present invention had comparable abrasion resistance to a conventionally made web.

As shown above, by the above data, the bonding material of the present invention creates more creping tension than conventionally used bonding materials. Also, the bonding material of the present invention creates a base web with improved wet tensile strength in the cross machine direction. Further, these properties are improved without compromising any other properties. In fact, since less creping adhesive is used, the bonding material of the present invention actually demonstrates greater adhesive efficiency.

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

What is claimed is:

1. A creped fibrous product comprising:

a base web made from fibers, said base web having a first side and a second side;

a bonding material applied to at least one of said sides of said base web, said bonding material being applied to said at least one side according to a predetermined pattern, said bonding material comprising an adhesive combined with composite particles, said composite particles having a median particle size of less than about 5 microns; and wherein said at least one side of said base web is creped after said bonding material has been applied.

2. A creped fibrous product as defined in claim 1, wherein said base web contains pulp fibers.

3. A creped fibrous product as defined in claim 1, wherein said composite particles have a median particle size of less than about 1 micron.

4. A creped fibrous product as defined in claim 1, wherein said composite particles have a median particle size of less than about 0.5 microns.

5. A creped fibrous product as defined in claim 1, wherein said composite particles have a particle size distribution of less than about 10 microns.

6. A creped fibrous product as defined in claim 3, wherein said composite particles have a particle size distribution of less than about 5 microns.

7. A creped fibrous product as defined in claim 4, wherein said composite particles have a particle size distribution of less than about 1 micron.

8. A creped fibrous product as define claim 1, wherein said composite particles are made from a material selected from the group consisting of clay, titanium dioxide, talc, zeolite, silica, and mixtures thereof.

9. A creped fibrous product as defined in claim 1, wherein said composite particles comprise kaolin clay.

10. A creped fibrous product as defined in claim 1, wherein said adhesive comprises a material selected from the group consisting of an acrylate, a vinyl acetate, a vinyl chloride, a methacrylate, and a styrene butadiene.

11. A creped fibrous product as defined in claim 1, wherein said adhesive comprises a cross-linked ethylene vinyl acetate copolymer.

12. A creped fibrous product as defined in claim 1, wherein said adhesive comprises a cross-linked latex adhesive.

13. A creped fibrous product as defined in claim 1, wherein said composite particles are present within said bonding material in an amount from about 10% to about 30% by weight.

14. A creped fibrous product comprising:

a base web comprising pulp fibers, the base web having a first side and a second side;

a bonding material applied to at least one side of the base web, the bonding material being applied to the at least one side according to a predetermined pattern, the bonding material comprising an adhesive combined with particles, the particles containing clay, the particles having a medium particle size of less than about 5 microns and have a particle size distribution such that at least about 98% of the particles have a particle size less than about 10 microns.

15. A creped fibrous product as defined in claim 14, wherein the particles have a medium particle size of less than about 1 micron.

16. A creped fibrous product as defined in claim 14, wherein the particles have a medium particle size of less than about 0.5 microns.

17. A creped fibrous product as defined in claim 14, wherein the particles comprise kaolin clay.

18. A creped fibrous product as defined in claim 14, wherein said adhesive comprises a material selected from the group consisting of an acrylate, a vinyl acetate, a vinyl chloride, a methacrylate, and a styrene butadiene.

19. A creped fibrous product as defined in claim 14, wherein said adhesive comprises a cross-linked ethylene vinyl acetate copolymer.

20. A creped fibrous product as defined in claim 14, wherein said adhesive comprises a cross-linked latex adhesive.

21. A creped fibrous product as defined in claim 14, wherein said particles are present within said bonding material in an amount from about 10% to about 30% by weight.

22. A creped fibrous product as defined in claim 18, wherein said particles are present within said bonding material in an amount from about 10% to about 30% by weight.

23. A creped fibrous product as defined in claim 19, wherein said particles are present within said bonding material in an amount from about 10% to about 30% by weight.

24. A creped fibrous product as defined in claim 14, wherein the bonding material is applied to both sides of the base web and wherein both sides of the base web have been creped after the bonding material has been applied.

25. A creped fibrous product as defined in claim 24, wherein the bonding material is applied to each side of the web in a pattern that covers from about 20% to about 50% of the surface area of each side of the web.

26. A creped fibrous product as defined in claim 1, wherein the bonding material is applied to both sides of the base web and wherein both sides of the base web have been creped after the bonding material has been applied.

27. A creped fibrous product as defined in claim 26, wherein the bonding material is applied to each side of the web in a pattern that covers from about 20% to about 50% of the surface area of each side of the web.

* * * * *